United States Patent
Kjolseth

(10) Patent No.: US 9,108,825 B2
(45) Date of Patent: Aug. 18, 2015

(54) RIG SUPPLY HANDLER

(75) Inventor: Paul M. Kjolseth, Edgewater, MD (US)

(73) Assignee: OCEANEERING INTERNATIONAL, INC., Houston, TX (US)

(*) Notice: Subject to any disclaimer, the term of this patent is extended or adjusted under 35 U.S.C. 154(b) by 1466 days.

(21) Appl. No.: 12/654,198

(22) Filed: Dec. 14, 2009

(65) Prior Publication Data

US 2010/0089855 A1 Apr. 15, 2010

Related U.S. Application Data

(63) Continuation-in-part of application No. 10/983,515, filed on Sep. 29, 2004, now abandoned.

(60) Provisional application No. 61/193,681, filed on Dec. 15, 2008.

(51) Int. Cl.
*G06F 7/00* (2006.01)
*B66C 13/02* (2006.01)

(52) U.S. Cl.
CPC .......... *B66C 13/02* (2013.01); *B60W 2510/20* (2013.01); *B60W 2520/10* (2013.01); *B60W 2520/14* (2013.01)

(58) Field of Classification Search
USPC ......................................................... 700/213
See application file for complete search history.

(56) References Cited

U.S. PATENT DOCUMENTS

| | | | | |
|---|---|---|---|---|
| 4,279,347 A * | 7/1981 | Appleman | .................... | 212/274 |
| 6,496,765 B1 | 12/2002 | Robinett, III et al. | | |
| 6,826,452 B1 * | 11/2004 | Holland et al. | ................ | 700/245 |
| 7,850,025 B2 * | 12/2010 | Neupert et al. | ................ | 212/275 |
| 2006/0151412 A1 * | 7/2006 | Norcross et al. | ............. | 212/308 |
| 2006/0182524 A1 * | 8/2006 | Franzen et al. | ............ | 414/139.9 |
| 2007/0276619 A1 * | 11/2007 | Sugahara et al. | ................ | 702/82 |
| 2008/0217279 A1 * | 9/2008 | Gelies et al. | .................. | 212/278 |

FOREIGN PATENT DOCUMENTS

WO   WO 94/16978   8/1994

* cited by examiner

*Primary Examiner* — Gene Crawford
*Assistant Examiner* — Kyle Logan
(74) *Attorney, Agent, or Firm* — Dentons US LLP

(57) ABSTRACT

A method of controlling a crane and a manipulator including determining the relative motion between a first platform including the crane and a second platform, determining the current position of the manipulator, and repositioning the manipulator to compensate for the relative motion between the first platform and the second platform and in accordance with operator commands.

20 Claims, 7 Drawing Sheets

RIG SUPPLY HANDLER

This application is a continuation-in-part of U.S. patent application Ser. No. 10/983,515 filed on Nov. 8, 2004, which is hereby incorporated by reference for all purposes as if fully set forth herein. This application also claims the benefit of U.S. Provisional Patent Application No. 61/193,681, filed on Dec. 15, 2008, which is hereby incorporated by reference for all purposes as if fully set forth herein.

STATEMENT REGARDING FEDERALLY SPONSORED RESEARCH OR DEVELOPMENT

This invention was made with government support under contract N00014-05-D-0521 awarded by the Office Of Naval Research. The government has certain rights in the invention.

BACKGROUND OF THE INVENTION

Field of the Invention

The present invention relates to a device and method that facilitates the safe and controlled cargo transfer between a first platform and a second platform that are moving relative to one another, for example, an offshore platform and an Offshore Supply Vessel (OSV). In a typical scenario associated with moving cargo between an OSV and an offshore platform, the OSV and platform are both subject to wave induced motions, resulting in significant relative 6 degree of freedom (6 DOF) motions. A conventional non-compensated single lift line crane installed on the platform lowers a hook onto the deck of the OSV. Two crew members manhandle the line and the hook to attach to the D-ring on the desired container or crate to be moved. The container is lifted off the deck. During this operation the wave induced motions can cause the container to move around wildly creating a significant safety hazard for the crew. Similarly, for retrograde containers, the crane operator lowers the container onto the moving deck, using nearby containers for impact support and guidance. This can lead to damage to the container being lowered or the containers on the deck. The crew members must once again go on deck to remove the hook from the load, thus creating significant safety issues for the crew. The present invention eliminates the need for the crew members going out on the deck to handle the hook. The present invention allows the latching of the loads to be moved, reduces the loading on the crane, and allows set-down without impacting containers nearby for alignment.

SUMMARY OF THE INVENTION

Accordingly, the present invention is directed to a rig supply handler that substantially obviates one or more of the problems due to limitations and disadvantages of the related art.

The present invention relates to a device that facilitates safe and controlled cargo transfer between a first platform and a second platform that are moving relative to one another, for example, an offshore platform and an Offshore Supply Vessel (OSV). Throughout the description of the present invention, the use of an offshore platform and an OSV are described, but the present invention is not limited to these. The present invention may be used with any two platforms that have a relative motion to one another. The device may include a removable manipulator and associated control system. The manipulator attaches to the jib of an offshore platform crane and enables the crane operator to pick and place cargo containers and crates on the deck of the OSV in a safe and controlled manner, without any manned intervention on deck during the overall transfer operation. The associated control system, which may also include sensors, provides drive signals for multi-axes real time synchronized motion compensation, thus enabling positive tracking during payload attachment and release. The proposed methodology also prevents a scenario where a lift hook can accidentally snag the vessel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of controlling a crane and a manipulator includes: determining the relative motion between a first platform including the crane and a second platform; determining the current position of the manipulator; and repositioning the manipulator to compensate for the relative motion between the first platform and the second platform and in accordance with operator commands.

In another aspect of the present invention, a supply handler includes: a manipulator attachable to a crane on a first platform including a plurality of joints wherein each joint has at least one actuator and a position sensor; a controller that controls the manipulator and the crane wherein the controller receives first motion information regarding the motion of the first platform, second motion information regarding the motion of a second platform, and operator commands to operate the crane and wherein the controller repositions the crane and the manipulator to compensate for the relative motion between the first platform and the second platform and in accordance with operator commands.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

The manipulator of the present invention may be considered as an add-on tool for a multi-purpose offshore crane in an application for retrograde transfer of cargo containers between an offshore supply vessel (OSV) and a semi-submersible drilling or other platform. The arrangement may be similarly used to re-supply a drillship or production platform or even another ship. The offshore vessel (OSV) and platform are both subject to wave induced motions, which for higher sea states result in significant relative 6 DOF motions.

Figure 1:
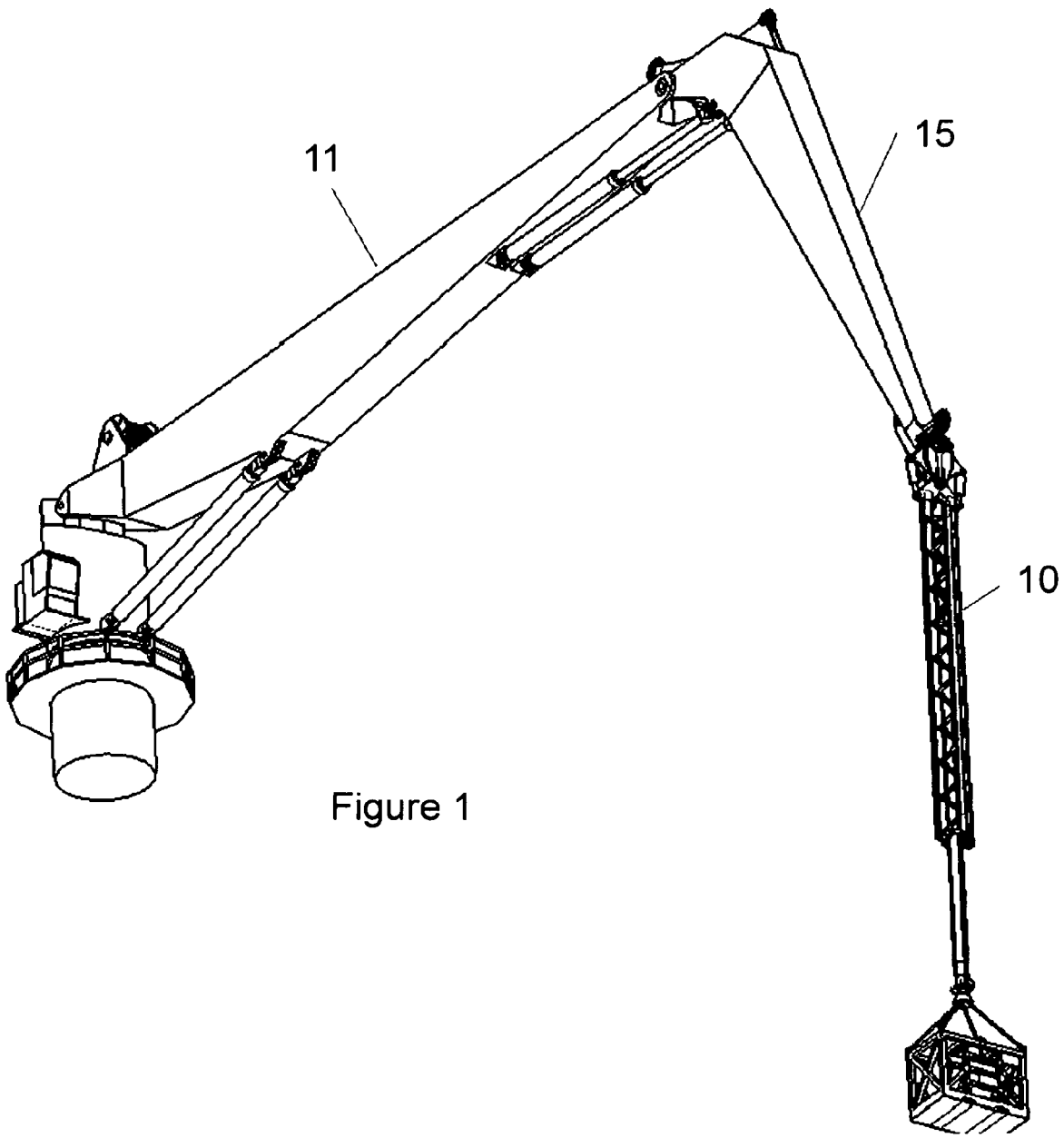
FIG. 1 illustrates a crane with a manipulator attached according to an embodiment of the present invention.
Figure 2:
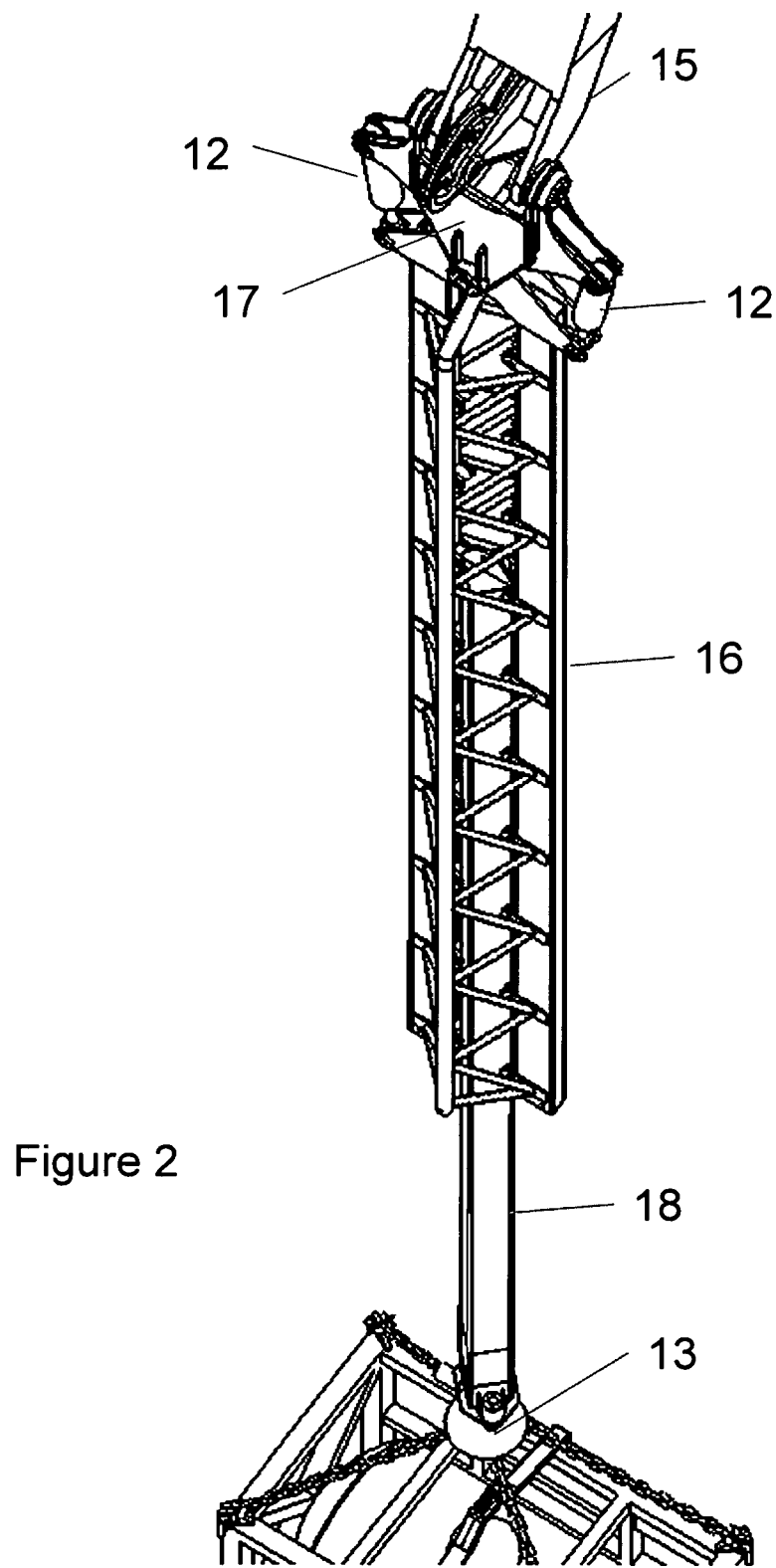
FIG. 2 further illustrates another view of the manipulator of an embodiment of the present invention.

FIG. 1 illustrates a crane with a manipulator attached according to an embodiment of the present invention. FIG. 2 further illustrates another view of the manipulator of an embodiment of the present invention. The manipulator 10 forms a rigid attachment to the crane 11, and include powered drives or acutators 12 that allow 4 DOF control (x, y, z translations and z-rotation) of the manipulator docking head 13 relative to the attachment point 14 (see FIG. 3) to the crane 11 (i.e., the end of the crane jib 15). The manipulator vertical axis is maintained within a limited cone angle to limit the lateral excursions of the docking head 13 relative to the attachment point 14. The maximum operational off-lead and side-lead angles are limited by the torsional load capacity of the crane 11. It is considered likely that the total motion due to platform roll, pitch and dynamic (DP) drift in many cases will cause the motion demanded of the manipulator 10 to exceed these angular limits. In this case the control system (not shown) will also control the crane 11 joint motions to compensate for the excessive travel. It is noted that by limiting the manipulator 10 joint torque capacity, the crane jib 15 will be protected from torsional overloads. The induced torsional load on the crane jib 15 is a function of the manipulator extension, working angle, payload and dynamic accelerations. It follows that in the no-load tracking mode the manipulator 10 is capable of extended lateral tracking without overloading the crane jib 15. By having a passive light-tension tracking mode as the docking head 13 engages the cargo crate lift ring, the operator may wait for the system to reach acceptable loaded limiting side-lead and off-lead angles before initiating the main lift.

During transfer, the DP controlled OSV will maintain a nominal standoff from the platform, but will be subject to drifting pending sea conditions and the efficiency of the DP controls and thruster system. The crane operator may start by moving the crane jib 15 and manipulator 10 to a position above the cargo container to be transferred.

Integrated sensor systems and controls are used to track the relative motions between the OSV, the offshore platform and the manipulator docking head 13. Control algorithms are then used to determine the required drive signals to be issued to the various crane and manipulator joints to make the docking head 13 track the motion of the container, and also to prevent overloading the crane jib 15. When the operator engages the tracking mode, the controller causes the docking head 13 to track a point in space right above and at a fixed vertical distance from the cargo crate D-ring (or other docking arrangement). The D-ring may be presented end up in a cross cage holder for ease of engagement with the docking head 13. Viewing through a downward looking camera attached at the docking head 13 the operator will see the D-ring appear stationary, with exception of the tilting motion due to relative roll and pitch, because as previously indicated, the system only compensates for x, y and z axes translations as well as z axis rotation. The remaining two rotational DOF's (due to roll and pitch) are not considered critical where the docking head and latch arrangement may be designed to accommodate the relative rotations, as is the case with the D-ring arrangement described here. Remaining in tracking mode, the operator maintains visibility through the camera and uses the operator controls to jog the docking head 13 towards the D-ring. The operator input signal is combined with the tracking commands produced by the controller to compensate for the relative motion between the docking head 13 and the D-ring. Returning the control stick to neutral makes the docking head track at this new position. When engaging the D-ring, the operator activates the latch and secures the payload. The controller may provide an indication to the operator that the manipulator 10 is tracking within the loaded limits and that load has cleared the OSV deck. The cargo container may then be brought to a safe height before the operator may choose to exit the tracking mode.

The docking head 13 may be provided with a passive depressor arrangement that dampens the payload pendulation motion below the docking head 13 through off-axis loading of the container lifting chains and may take various forms. This enables effective payload control during in-air handling and during placement on deck. Other types of equipment may be used to engage and lift the cargo as well.

Retrograde operations, i.e., bringing empty containers or trash back onto the deck of the OSV are performed in the same way. The operator may move the container close to the moving OSV deck, engage the tracking mode and lower the container to the deck. The remote latch release avoids the need for deck crew support.

In FIGS. 1 and 2 the manipulator 10 is shown as including a vertical guide frame 16 suspended from a gimbal 17 and actuator 12, with a traveling beam 18 (vertical z) and rotating docking head 13 at the lower end. The arrangement provides 4 DOF effective motion control (x, y, z translations and z-rotation), which is sufficient for the intended application. The docking and latch interface is arranged to enable positive engagement with reasonable tracking errors and in the presence of the remaining uncompensated relative x, y rotations. The vertical motion of the traveling beam 18 may be controlled with a lift line from a motion compensated winch located on the crane. Sensors provide motion information to the controller to monitor the 6 DOF relative motion between the platform and vessel. Two configurations may be used to track the position of the docking head 13: a sensor system that provides position information using sensors placed on the docking head 13; or a method of measuring the angles of the joints of the crane 11 and manipulator 10 and using forward kinematics algorithms to determine the location of the docking head 13. In synchronized operation, the control system uses the sensor signals to calculate and command drive signals for the individual manipulator 10 and crane 11 joints to make the docking head 13 automatically track the motion of the cargo platform below as if the docking head 13 was fixed in the cargo platform reference frame. The operator input signal is combined with the tracking commands produced by the controller to compensate for the relative motion between the docking head 13 and the D-ring.

Sensor suites will be located on both the OSV and the offshore platform to accurately sense relative motions. The motion sensors may be optical sensors, radio frequency sensors, GPS, differential GPS, or inertial motion sensors or a combination of these sensors. Any sensor or sensor system that can provide the needed positional accuracy and data rates may be used. Also, sensors may be permanently installed in the supply ship or other platform or may be modular in nature so that they can be deployed on the supply ship or other platform. The data produced by the sensors is communicated to the control system.

To compensate for the continuous drifting between the crane platform and the DP controlled cargo platform during a transfer operation, the control system may also provide a drive signal that will modulate the crane slew and luff drives to maintain the end of the crane jib 15 in a nominal position relative to the drifting vessel and limit the induced torsional load in the crane jib 15.

The manipulator 10 may be used as part of a custom crane or as a modular tool attachment to a multipurpose crane. For the modular approach, the manipulator 10 may be designed so that the tool exchange will be achieved with minimal effort and time. The manipulator 10 in the modular approach may have a permanent support and storage location for the manipulator 10 (onboard the platform) that allows the crane jib 15 to be guided into position for easy (possibly remote) engagement of locking pins at the gimbal 17 and inboard drive cylinders 24 (Y-drive). Additional attachments include electrical and/or hydraulic power, as well as the compensated lift line. During operation, the outer crane jib 15 will typically not be required to move past vertical, and the ideal location for the manipulator 10 attachment may be through cheek plates 19 and cylinder anchor brackets 20 added to the underside of the outer crane jib just clear of the primary lift rope and support sheaves 21. A second configuration may be to have the manipulator simply fold itself under the forearm of the crane and remain permanently attached to the crane when not in use. The manipulator lift line is considered as a secondary lift line, and will typically be smaller and of lesser capacity than the primary lift line. The line may be customized for manipulator usage, which will minimize winch size and cable length. Alternatively, this line may also be used as a secondary multipurpose lift line or rigging line.

Figure 3:
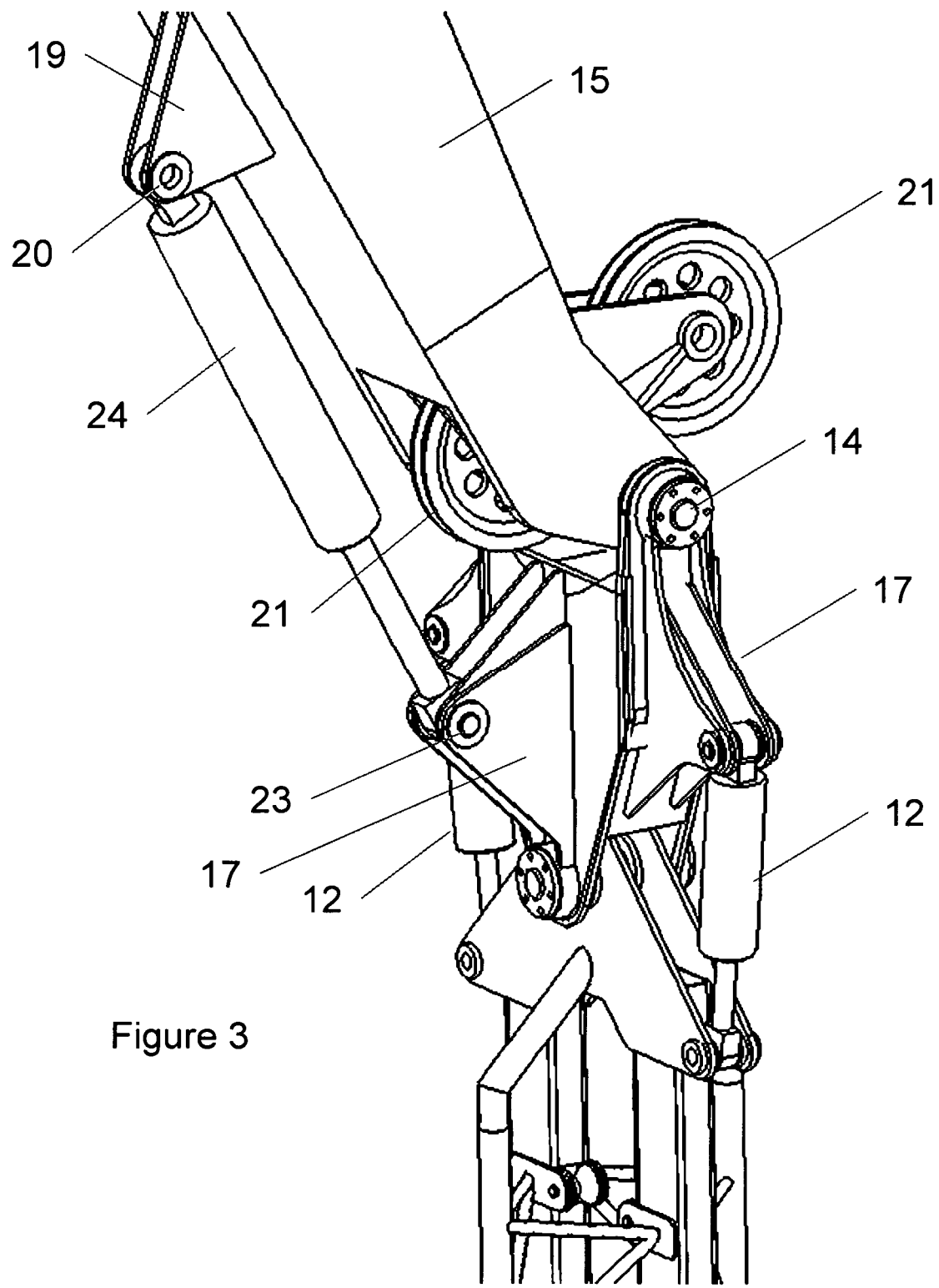
FIGS. 3 and 4 illustrate the connection of the manipulator to the crane jib.
Figure 4:
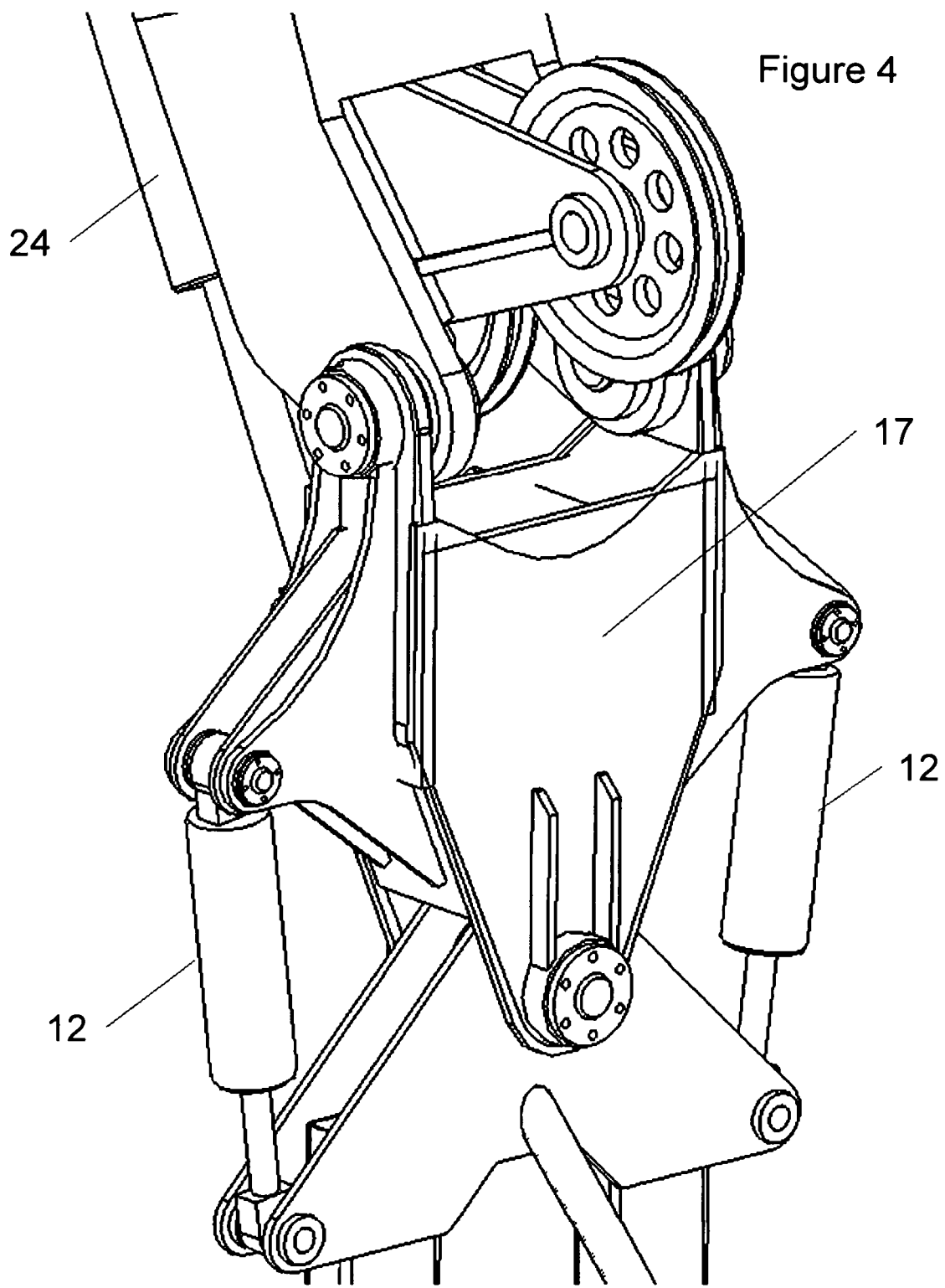
Figure 5:
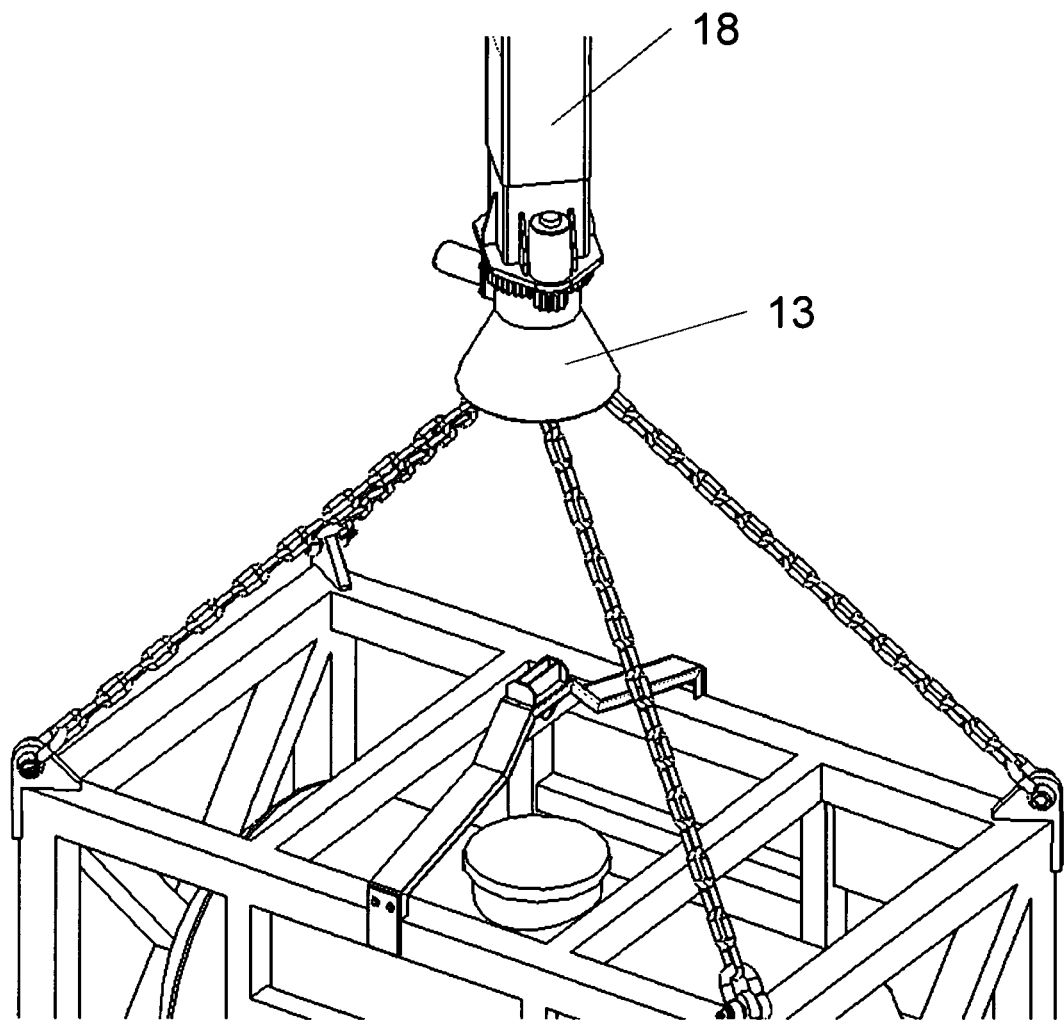
FIG. 5 illustrates the docking head attached to chains lifting cargo.

FIGS. 3 and 4 illustrate the connection of the manipulator to the crane jib. FIG. 5 illustrates the docking head 13 attached to chains lifting cargo. The gimbal frame 17 may be attached to the crane jib 15 through pivot brackets 14 (at cheek plates) the pivot axis (y-axis) being across the jib longitudinal axis. The gimbal attitude relative to the crane jib 15 may be controlled by one or several hydraulic or electric actuators 24 (rotary or linear) attached between the gimbal frame 17 and the crane jib 15. During normal operation without synchronized tracking, the drive may be left in a damped float mode that ensures the manipulator maintains a nominal vertical orientation, yet not subject to free pendulation. During synchronized tracking, the drive controls form part of a closed loop control circuit including the motion sensors and manipulator control system with control algorithms. The resulting angular displacement made relative to the vertical is referred to as the off-lead angle. Overload relief (hydraulic) or another mechanism is included to prevent excessive loading. The maximum achievable drive angle is dependent on the load and extension of the manipulator. The guide frame 16 is configured to align with the jib turning sheave and for the lift line to pass freely through the center of the guide frame 16 for all normal jib operating angles. The actuator 24 causing docking head motion along the x-axis is referred to as the lateral x-drive or the LX drive.

As shown in FIGS. 3 and 4, the guide frame 16 is suspended at the lower end of the gimbal frame 17 from pivot brackets aligned with the x-axis or jib nominal longitudinal axis. The guide frame 16 attitude relative to the gimbal is controlled by two hydraulic or electric actuators 12 attached between the gimbal frame 17 and the guide frame 16. The actuators 12 have similar operational modes and characteristics as described for the gimbal actuator 24 with similar overload protection. The associated angular displacement is referred to as the side-lead angle. Side-lead displacements and accelerations along the y axis will be the cause for induced torsional loads on the crane jib 15, which limiting loads typically will be lower than those tolerated for off-lead offsets and x-axis accelerations. The drive cylinder 12 causes docking head 13 motion along the y-axis and is referred to as the lateral y-drive or the LY drive. The guide frame 16 may be configured with a truss configuration to provide a light weight rigid support frame whose length depends upon the application and that provides support for the traveling beam 18. Fixed and preloaded guide rollers (and bushes) may be used to provide a reliable reference and improved positional accuracy. A cable management system may be attached to the guide frame 16 and used to control the service lines feeding the docking head 13.

The traveling beam 18 may be supported by the lift line and restrained laterally by the guide frame 16. The lower end of the traveling beam 18 supports the docking head 13 assembly. The traveling beam 18 may be relatively light weight to minimize the added mass to be compensated during the synchronized tracking mode. Yet the cross section should be sufficient to support the payload and resist the limiting induced side loads due to side-lead and off-lead angles as well as lateral accelerations. Also, the minimum weight of the traveling beam 18 must overcome any friction in the guide arrangement to ensure that the traveling beam 18 operates freely in response to the vertical compensated motion. It is proposed that a lift line connector be added internally between the winch line attachment and the docking head 13 to facilitate the necessary factor of safety for supporting hanging loads.

The traveling beam 18 vertical motion is controlled by the motion of the winch line. The preferred arrangement is to use a customized compensated manipulator winch that is capable of meeting the speed requirements. Using the primary lift winch for the manipulation application may not be a practical solution, and will cause additional complexity during manipulator attachment and removal. A small customized manipulator winch may be installed on the lower side of the outer crane jib, which would simplify rigging. The manipulator winch operates in closed loop controlled system in response to the drive commands issued by the manipulator control system.

The docking head assembly 13 may include a docking cone, a latch assembly and a gear drive for rotary motion about the z-axis referred to as the RZ-drive. The docking head assembly 13 is guided at the lower end of the traveling beam 18 and secured to the internal lift line connector. The assembly may be pushed upward a limited amount relative to the end of the traveling beam 18, which prevents excessive loading to be induced as the docking head 13 engages the cargo crate lift interface. The worst case vertical loading will be limited to the weight of the traveling beam and laterally to the overload limit of the LX and LY drives.

The rotational Z-drive or RZ drive enables continuous rotation of the latch assembly and outer cone. The drive may be put into freewheel mode during docking engagement to allow free alignment between the D-ring and latch interface.

The notional docking interface may be based on interfacing with a modified conventional cargo crate or container, the payload lifted through 4 chains connected to a common D-ring. The modification may include the addition of a central cross brace including a holder to support and present the D-ring. The cross brace may be configured with reasonable vertical flexibility or springiness to prevent excessive shock loading. The outer cone will ensure positive engagement with relatively liberal tracking errors. As the docking head is lowered onto the D-ring, the RZ-drive may be put in freewheel mode. The latch interface transitions into an oval taper section, forcing the docking head to align with the D-ring. An internal bar strip prevents the D ring from getting stuck at right angle to the desired engagement. The D-ring is latched by activating the latch cylinder, which pushes a latch pin through the D-ring into an opposing support boss. The pin is shaped to prevent release if under load. Alternative latch arrangements may be used pending availability and proven reliability.

A damping mechanism may be included as part of the docking head that provides a positive lateral load on the lift chains. This will prevent undue pendulation of the load beneath the docking interface and help rotational control during close deck operations.

Figure 6:
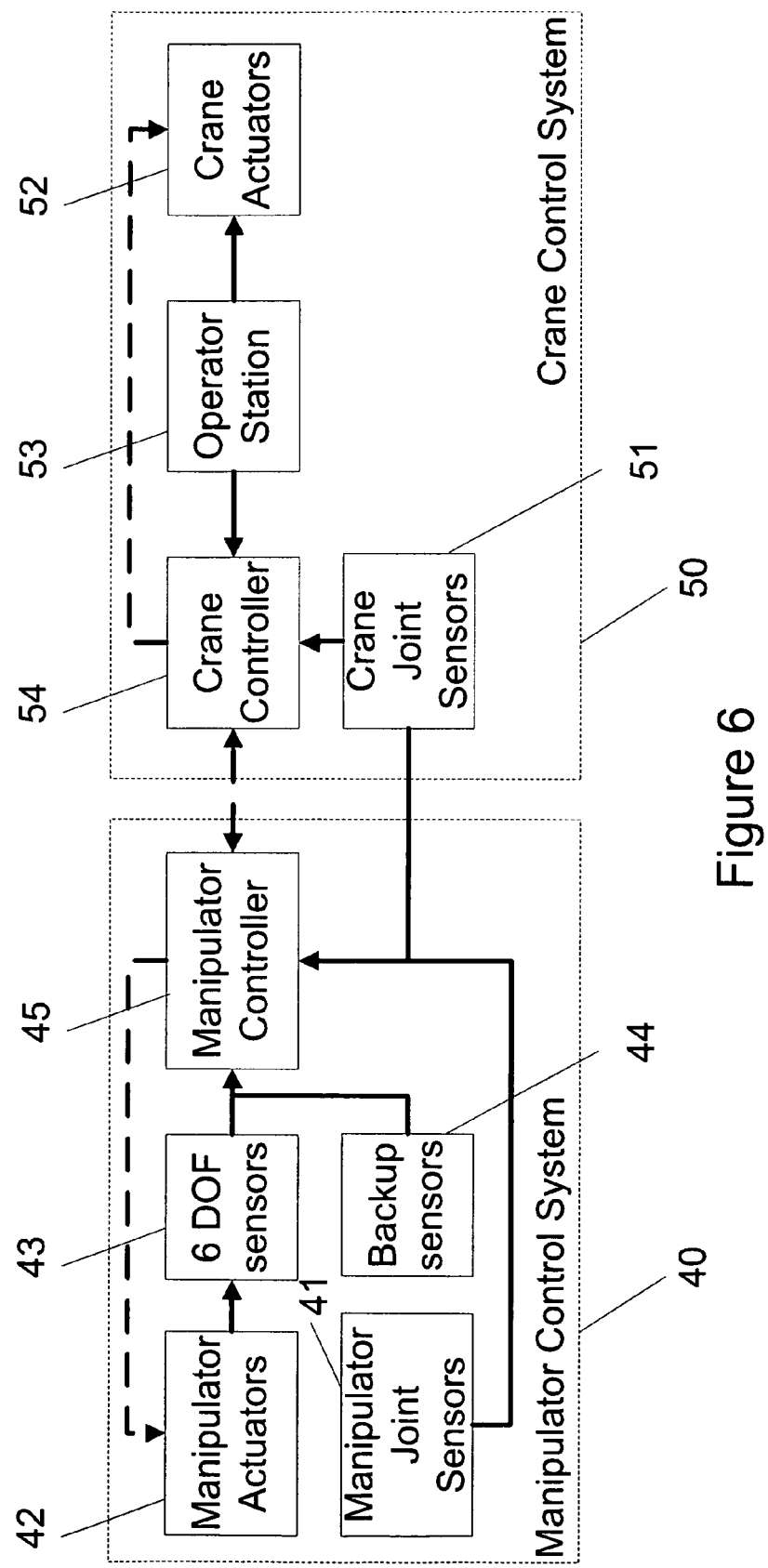
FIG. 6 illustrates a high level block diagram of how the manipulator control system interacts with the standard crane control system.
Figure 7:
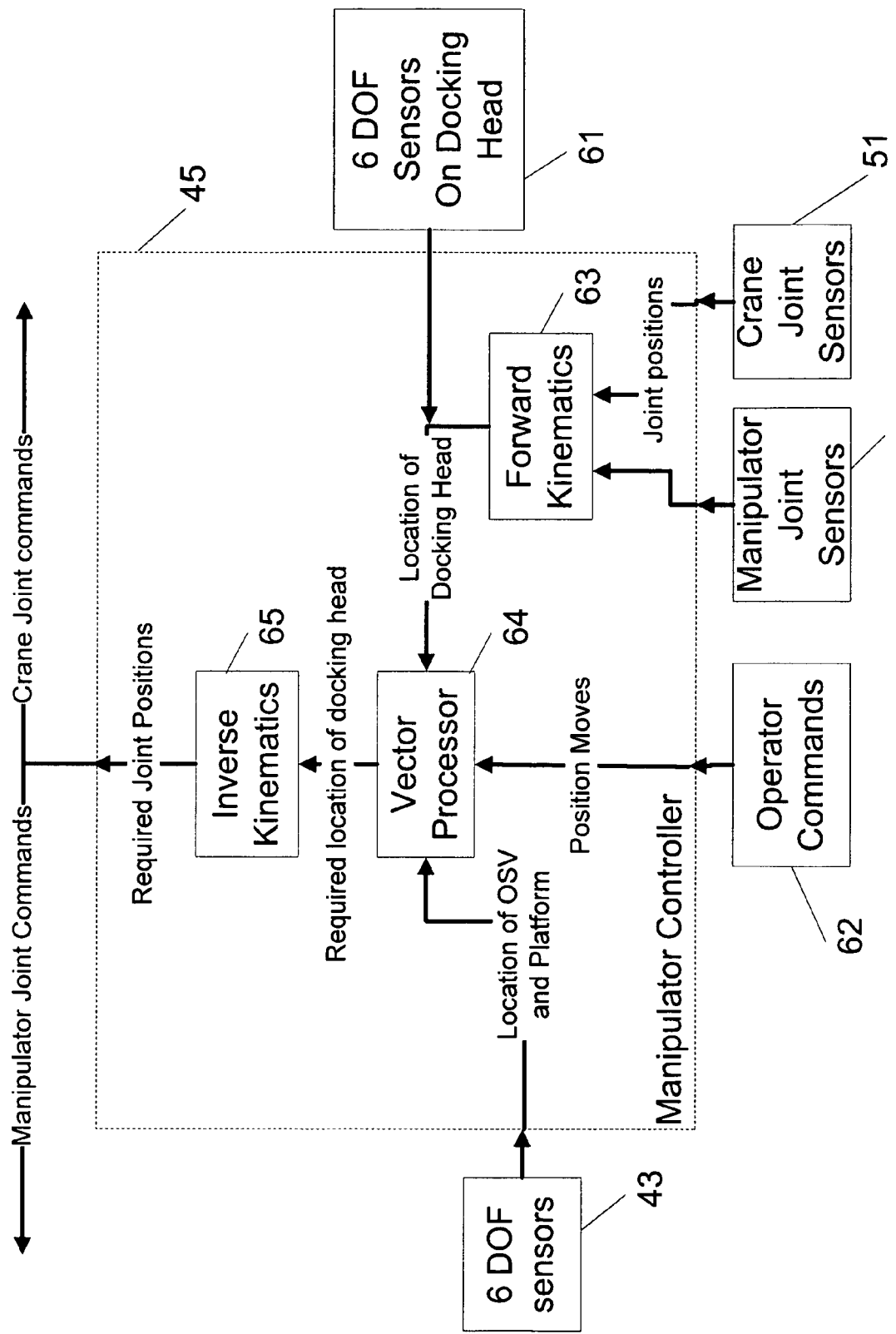
FIG. 7 illustrates a block diagram of the manipulator controller.

The manipulator system includes a control system that is capable of real time motion sensing and control of the manipulator drives and the crane drives. FIG. 6 illustrates a high level block diagram of how the manipulator control system interacts with the standard crane control system. FIG. 7 illustrates a block diagram of the manipulator controller.

In FIG. 6 the manipulator control system 40 interacts with the crane control system 50. The crane control system includes crane joint sensors 51, crane drives 52, an operator station 53, and a crane controller 54. The crane joint sensors 51 sense the position of the crane joints. From these joint positions the position of the end of the crane jib 15 may be determined. The crane joint sensors 51 provide joint position information to the crane controller 54. The crane drives 52 position the crane 11 based upon commands received from the operator station 53. The crane controller 54 controls the crane 11 according to the operator commands. The crane controller also receives an input from the manipulator controller 45 to compensate for motion between the OSV and the platform.

The manipulator control system 40 includes manipulator joint sensors 41, manipulator actuators 42, 6 DOF sensors 43, backup sensors 44, and a manipulator controller 45. The manipulator joint sensors 41 sense the position of the manipulator joints. From these joint positions the position of the docking head 13 may be determined relative to the gimbal 17. The manipulator joint sensors 41 provide joint position information to the manipulator controller 45. The manipulator actuators 42 position the manipulator 10 based upon commands received from the manipulator controller 45. The 6 DOF sensors 43 are located on the OSV and the platform. The 6 DOF sensors measure motion in three translational directions and three angular directions. The information from the 6 DOF sensors is fed to the manipulator controller 45. Backup sensors 44 may also be present to provide motion information to the manipulator controller 45 in case of failure of the 6 DOF sensors. The manipulator controller 45 controls the manipulator 10 and the crane 11 to compensate for motion between the OSV and the platform.

The manipulator controller 45 is shown in further detail in FIG. 7. The manipulator controller 45 receives inputs from various sources. The 6 DOF sensors 43 provide location information for the OSV and the platform. This data is provided at a rate and accuracy sufficient to allow for compensation of a desired sea state and to satisfy other operational constraints. The crane control system 50 provides the operator commands 62. The manipulator joint sensors 41 and the crane joint sensors 51 each provide joint information that may be used to determine the positions of the crane 11 and the manipulator 10. Further, 6 DOF sensors on the docking head 13 may be present to provide location information for the docking head 13.

The forward kinematics takes the manipulator joint position information and the crane joint position information and determines the location of the docking head 13. Also, the docking head 6 DOF sensor information, if available, may be used in place of or in addition to the docking head location information determined by the forward kinematics 63. The docking head 6 DOF sensor information may also serve as a backup to the docking head location information determined by the forward kinematics 63. The vector processor 64 receives the docking head location information, the operator commands, OSV location, and platform location information. The vector processor 64 performs any coordinate transformations if necessary, so that all of the location information is in the same coordinate frame. The vector processor 64 then determines the required location of the docking 13 head based upon the various inputs received. The required location of the docking head 13 is then provided to the inverse kinematics. The inverse kinematics determines the required joint position of the manipulator 10 and the crane 11 to place the docking head 13 in the required position. These required joint positions are used to provide manipulator joint commands to the manipulator actuators 42 and crane joint commands to the crane controller 54. The manipulator controller 45 repeatedly updates the manipulator and crane joint commands to compensate for operator commands and relative motion between the OSV and the platform.

An objective of the manipulator controller 45 is to track within the operational limits of the manipulator 10 and to not exceed the torsional limit of the crane jib 15. Hence, the required joint positions will be determined to avoid these problems. Further, in the event of an manipulator failure, the controls will revert to basic crane controls.

The manipulator controller 45 may be implemented using a general purpose processor and software running on that processor or in dedicated hardware or some combination thereof. Also, the various functions of the controller may be implemented in separate processors and or dedicated hardware.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of controlling a crane and a manipulator attached to the crane comprising:
   determining the relative motion between a first platform including the crane and a second platform;
   determining the current position of the manipulator; and
   repositioning the manipulator to compensate for the relative motion between the first platform and the second platform and in accordance with operator commands,
   wherein the manipulator includes a substantially vertical oriented beam movable within a guide frame.

2. The method of claim 1, wherein determining the current position of the manipulator includes receiving information from joint sensors on the crane and the manipulator.

3. The method of claim 1, wherein determining the current position of the manipulator includes receiving information from sensors on a docking head located at the end of the beam opposite the crane.

4. The method of claim 1, wherein:
   determining the relative motion between the first platform and the second platform includes receiving motion information from first sensors on the first platform and second sensors on the second platform; and
   repositioning the manipulator further includes:

determining the location of a docking head located at the end of the beam opposite the crane;

determining a required location of the docking head based upon the determined relative motion between the first platform and the second platform and based upon any operator commands; and producing manipulator and crane commands to move the docking head to the required location by determining required joint positions for the manipulator and crane.

5. The method of claim 1, further comprising:
connecting the manipulator to a payload on the first platform and lifting the payload; and
placing the payload on the second platform.

6. The method of claim 1, wherein determining the relative motion between the first platform and the second platform includes receiving motion information from first sensors on the first platform and second sensors on the second platform.

7. The method of claim 6, wherein the motion information includes six-degree of freedom motion information.

8. The method of claim 1, wherein repositioning the manipulator further includes:
determining the location of a docking head located at the end of the beam opposite the crane;
determining a required location of the docking head based upon the determined relative motion between the first platform and the second platform and based upon any operator commands; and
producing manipulator and crane commands to move the docking head to the required location.

9. The method of claim 8, wherein producing manipulator and crane commands includes determining required joint positions for the manipulator and crane.

10. The method of claim 9, wherein producing the manipulator and crane commands is limited by load limits for each joint of the manipulator and crane.

11. The method of claim 1, further comprising:
connecting the manipulator to a payload on the second platform and lifting the payload.

12. The method of claim 11, further comprising:
preventing connecting the manipulator to a payload if an angle of a manipulator vertical axis from vertical exceeds a predetermined angle.

13. The method of claim 1, wherein the guide frame is a vertical guide frame and the beam is configured to move vertically within the vertical guide frame.

14. The method of claim 13, wherein the vertical guide frame comprises a truss configuration surrounding the outer surface of a portion of the beam.

15. A supply handler comprising:
a manipulator including a substantially vertical oriented beam movable within a guide frame, the manipulator attachable to a crane on a first platform, the crane including a plurality of joints wherein each joint has at least one actuator and a position sensor; and
a controller that controls the manipulator and the crane,
wherein the controller receives first motion information regarding the motion of the first platform, second motion information regarding the motion of a second platform, and operator commands to operate the crane, and
wherein the controller repositions the crane and the manipulator to compensate for the relative motion between the first platform and the second platform and in accordance with operator commands.

16. The supply handler of claim 15, wherein the guide frame is a vertical guide frame and the beam is configured to move vertically within the vertical guide frame.

17. The supply handler of claim 15, further comprising:
first motion sensors on a first platform that produce the first motion information; and
second motion sensors on a second platform that produce the second motion information.

18. The supply handler of claim 17, wherein the first and second motion information include six-degree of freedom motion information.

19. The supply handler of claim 15, further comprising:
a docking head located at the end of the beam opposite the crane, including a latch that is capable of latching to cargo.

20. The supply handler of claim 19, further comprising:
position sensors on the docking head.

* * * * *